United States Patent

[11] 3,625,983

| | | |
|---|---|---|
| [72] | Inventor | John C. Wollensak<br>Bloomfield Hills, Mich. |
| [21] | Appl. No. | 37,348 |
| [22] | Filed | May 14, 1970 |
| [45] | Patented | Dec. 7, 1971 |
| [73] | Assignee | Ethyl Corporation<br>New York, N.Y. |

[54] OXIDATION OF 2,4,6-TRI-TERT-ALKYLPHENOLS WITH AN ALKALI METAL HYDROXIDE CATALYST
7 Claims, No Drawings

[52] U.S. Cl.......................................................... 260/396 R,
260/624 E, 260/624 R
[51] Int. Cl............................................................ C07c 49/64
[50] Field of Search............................................. 260/396 R

[56] References Cited
UNITED STATES PATENTS

| | | | |
|---|---|---|---|
| 2,334,103 | 11/1943 | Koelsch.......................... | 260/396 |
| 2,657,222 | 10/1953 | Allen et al. ................... | 260/396 |
| 3,213,114 | 10/1965 | Braxton, Jr. et al........... | 260/396 |

*Primary Examiner*—Lorraine A. Weinberger
*Assistant Examiner*—Vivian Garner
*Attorney*—Donald L. Johnson ABSTRACT: Oxidation of 2,4,6-tri-tert-alkylphenols using an alkali metal hydroxide catalyst such as potassium hydroxide yields 2,6-di-tert-alkyl-p-benzoquinone. The reaction is promoted by the addition of water and a small amount of a copper halide such as cuprous chloride. The products are readily converted to p-hydroquinones by reduction. These are antioxidants and can be used as chemical intermediates.

OXIDATION OF 2,4,6-TRI-TERT-ALKYLPHENOLS WITH AN ALKALI METAL HYDROXIDE CATALYST

BACKGROUND

Braxton et al, in U.S. Pat. 3,213,114, describe a process for making p-benzoquinones by oxidizing a 2,4,6tri-tert-alkylphenol with air in the presence of a variety of conventional oxidation catalysts. The catalysts contain transitional metals or Lanthanide series elements. The most preferred catalyst is a cuprous chloride-pyridine complex. It has now been found that good results can be obtained using a simple alkali metal hydroxide catalyst. Not only are the yields high, but the system is noncorrosive and permits the use of mild steel reaction vessels.

SUMMARY

This invention relates to a process for making p-benzoquinones by oxidizing 2,4,6-tri-tert-alkylphenols with an oxygen-containing gas such as air using an alkali metal hydroxide catalyst and, optionally, water and a small promoter amount of a copper halide.

DESCRIPTION OF THE PREFERRED EMBODIMENTS

A preferred embodiment of this invention is a process for preparing a 2,6-di-tert-alkyl-p-benzoquinone, said process comprising contacting a 2,4,6-tri-tert-alkylphenol wherein said tert-alkyl groups contain from four to about 12 carbon atoms with an oxygen-containing gas in the presence of a catalytic amount of an alkali metal hydroxide.

Briefly, the process is conducted by adding the catalyst to the 2,4,6-tri-tert-alkylphenol, heating the mixture to reaction temperature and then passing an oxygen-containing gas through the mixture until a substantial conversion of the 2,4,6-tri-tert-alkylphenol to a 2,6-di-tert-alkyl-p-benzoquinone is obtained. The product is recovered by conventional means.

Although not required, solvents may be employed and are generally desirable. They serve to facilitate the reaction and render material handling much more convenient. The solvents can be any of those disclosed in U.S. Pat. 3,213,114. However, the preferred solvents are the aromatic hydrocarbons such as benzene, toluene or xylene. The most preferred solvent is toluene. The amount of solvent should be sufficient to render the reaction phase liquid at the reaction temperature. Good results are obtained using from about 50–500 parts of solvent for each 175 parts of the phenol, and a preferred amount is from about 100–150 parts of solvent per 175 parts of the phenol.

Suitable alkali metal hydroxides include lithium hydroxide, sodium hydroxide, potassium hydroxide, rubidium hydroxide, cesium hydroxide, and the like. The most preferred catalyst is potassium hydroxide.

The amount of alkali metal hydroxide should be sufficient to catalyze the reaction at an acceptable rate. Good results are obtained using from about 10–250 parts per 1,000 parts of 2,4,6-tri-tert-alkylphenol. A preferred range is from about 50–100 parts of alkali metal hydroxide per 1,000 parts of the tri-tert-alkylphenol.

The reaction temperature should be high enough to promote the reaction at a good rate, but not so high as to lead to an excessive amount of decomposition. Although operable over a very broad range, better results are obtained in a temperature range of from about 50°–200° C., and a more preferred range is from about 100°–150° C.

Although not essential, better results are also obtained if a small amount of water is added. This promotes the catalytic effectiveness of the alkali metal hydroxide. The amount added should be sufficient to increase the reaction rate, but not so much as to extract the alkali metal hydroxide into a separate water phase. A useful range is from about 1–50 parts of water per 1,000 parts of the tri-tert-alkylphenol. A more preferred range is from about 15–30 parts of water per 1,000 parts of tri-tert-alkylphenol.

Another facet of the invention is the optional use of a small promoter amount of a copper halide promoter. Suitable copper halides include cupric chloride, cuprous chloride, cupric bromide, cuprous bromide, cupric iodide, cuprous iodide, and the like. The most preferred copper halide promoter is cuprous chloride.

The amount of copper halide should be an amount sufficient to promote or accelerate the reaction rate and give higher yields. Only very small amounts are required to accomplish this. From about 0.25–5 parts of copper halide per 1,000 parts of 2,4,6-tri-tert-alkylphenol is a useful range. A preferred range is from about 0.5–1 part per 1,000 parts of the tri-tert-alkylphenol.

The 2,4,6-tri-tert-alkylphenols can be any phenol in which each of the 2,4,6-positions are substituted with a tertiary alkyl group. Although larger tertiary alkyl groups do not hinder the operability of the process, for practical considerations the process is most useful on those containing up to about 12 carbon atoms. Some examples of useful phenols include 2,4,6-tri-tert-butylphenol, 2,4-di-tert-amyl-6-tert-butylphenol, 2,4,6-tri-(1,1,3,3-tetra-methyl-n-butyl)phenol, 2-tert-butyl-4,6-di-tert-octylphenol, 2,6-di-tert-butyl-4-(1-ethyl-1-n-propyl-n-amyl)phenol, 2,4,6-tri-tert-octylphenol, 2,4,6-tri-(1,1-dimethyl-n-butyl)phenol, 2,6-di-tert-amyl-4-tert-butylphenol, 2,4,6-tri-(1-ethyl-1-methyl-n-propyl)phenol, 2,4-di-tert-butyl-6-(1,1,3,3-tetramethyl-n-amyl)phenol, 2-($\alpha$ $\alpha$-di-methyl-benzyl)-4,6-di-(1,1-dimethyl-n-nonyl)phenol, 4-tert-butyl-2,6-di-($\alpha,\alpha$-dimethyl-benzyl)phenol, 2-($\alpha,\alpha$-diethylbenzyl)-4,6-di-(1,1-dimethyl-n-amyl)phenol, 2,4,6-tri-(1-ethyl-1-methyl-n-nonyl)phenol, 2,4,6-tri-($\alpha,\alpha$-dimethylbenzylphenol), 2,6-di-tert-butyl-4-($\alpha,\alpha$-dimethylbenzyl)phenol, 2,6-di-tert-butyl-4-($\alpha,\alpha$-diethylbenzyl)phenol and 2,4,6-tri-($\alpha,\alpha$-diethyl-p-methylbenzyl)phenol.

In a preferred embodiment the 2,6-tert-alkyl groups on the phenol provide at least as much steric hindrance to their positions on the phenol ring as does the tert-alkyl groups at the 4-position. With this configuration, higher yields of 2,6-di-tert-alkyl-benzoquinones are realized. Examples of phenols falling within this embodiment include 2,4,6-tri-tert-butylphenol, 2,4,6-tri-tert-amylphenol, 2,4,6-tri-(1,1,3,3-tetramethyl-n-butyl)phenol, 2,6-di-($\alpha,\alpha$-dimethylbenzyl)-4-tert-butylphenol, 2,6-di-(1,1,3,3-tetramethyl-n-amyl)-4-tert-amylphenol, 2,6-di-($\alpha,\alpha$-diethylbenzyl)-4-(1-ethyl-1-methyl-n-propyl)phenol, 2,6-di-($\alpha,\alpha$-diethyl-p-methylbenzyl)-4-tert-butylphenol, 2,4-di-tert-butyl-6-tert-amylphenol, 2,6-di-tert-octyl-4-(1,1-dimethyl-n-butyl)phenol, 2,6-di-(1-ethyl-1-methyl-n-nonyl)-4-tert-amylphenol, 2,4,6-tri-(1,1-dimethyl-n-nonyl)phenol, 2,6-di-tert-octyl-4-(1,1-dimethyl-n-amyl)phenol, 2,6-di-($\alpha$-ethyl-$\alpha$-methyl-benzyl)-4-tert-butylphenol and 2,6-di-($\alpha,\alpha$-diethylbenzyl)-4-($\alpha,\alpha$-di-methylbenzyl)phenol.

In a further preferred embodiment of this invention the 2,4,6-tri-tert-alkyl groups are all the same. Examples of compounds falling within this highly preferred embodiment include 2,4,6-tri-tert-butylphenol, 2,4,6-tri-(1-ethyl-1-methyl-n-propyl)phenol, 2,4,6-tri-(1,1-dimethyl-n-butyl)phenol, 2,4,6-tri-(1,1-dimethyl-n-amyl)phenol, 2,4,6-tri-(1,1,3,3-tetramethyl-n-butyl)phenol, 2,4,6-tri-(1-ethyl-1-methyl-n-butyl)-phenol, 2,4,6-tri-(1,1-diethyl-n-butyl)phenol, 2,4,6-tri-(1,1-di-ethyl-n-propyl)phenol, 2,4,6-tri-tert-amylphenol, 2,4,6-tri-($\alpha,\alpha$-dimethylbenzyl)phenol, 2,4,6-tri-(1,1,3,3-tetramethyl-n-amyl)phenol, 2,4,6-tri-($\alpha,\alpha$-diethylbenzyl)phenol, 2,4,6-tri-($\alpha,\alpha$-di-ethyl-p-methyl-benzyl)phenol, 2,4,6-tri-(1-ethyl-1-methyl-n-nonyl)phenol and 2,4,6-tri-($\alpha,\alpha$-diethylbenzyl)phenol.

In the most particularly preferred embodiment of this invention the tri-tert-alkylphenol is 2,4,6-tri-tert-butylphenol. This phenol can be produced by butylating phenol employing the process described in U.S. Pat. 2,831,898. Thus, in a highly preferred embodiment the 2,4,6-tri-tert-alkylphenol is in the form of the residue remaining after distilling the mono- and di-tert-butylphenols from the reaction product obtained when isobutylating phenol following the process described in U.S. Pat. 2,831,898.

The conversion of the phenol to benzoquinone is accomplished by passing an oxygen-containing gas through the tri-tert-butylphenol containing the catalyst. Although any oxygen-containing gas can be used, it is preferred that this gas be air because of its low cost and easy availability. The rate at which the conversion is attained depends to a great extent upon the rate that the air is passed through the mixture. The rate is also increased by conducting the reaction under pressure. In fact, at elevated temperatures when a solvent such as toluene is employed it is necessary to maintain the reaction zone under pressure to prevent the solvent from vaporizing off. Hence, in a preferred embodiment, air is passed through the reaction mixture while maintaining the reaction zone under pressure. The pressure should be sufficient to maintain the ingredients in the reaction mixture in a liquid state and thus depends upon the temperature. Good results are attained at pressures from about 50–1,000 p.s.i.g. A more preferred pressure range is from about 100–500 p.s.i.g.

The progress of the reaction can be easily followed by comparing the oxygen content of the gas leaving the reaction zone to the oxygen content of the gas being passed into the reaction zone. For example, when the gas is air, the oxygen content of the exit gas after a substantial amount of the reaction is completed will start to rise towards the normal oxygen content of air. Generally it is preferred to stop the reaction when the oxygen content of the exit gas reaches about 15 percent in order to avoid the possibility of forming explosive mixtures in the reaction zone.

The manner in which the reaction is conducted will be apparent from the following examples. All parts are parts by weight unless otherwise specified.

EXAMPLE 1

Use of Potassium Hydroxide Catalyst

In a pressure reaction vessel equipped with a stirrer, air delivery tube and a pressure regulated gas vent was placed 376 parts of distillation bottoms from the isobutylation of phenol carried out by the process of U.S. Pat. 2,831,898, after distilling out mono- and di-tert-butyl phenols. The bottoms analyzed 86 weight percent 2,4,6-tri-tert-butylphenol. Then, 28 parts of potassium hydroxide and 375 parts of toluene were added. The vessel was sealed and, while stirring, heated to 120° C. Air was then passed into the vessel below the liquid level and the pressure allowed to increase to 325 p.s.i.g. At this pressure, the pressure regulating vent opened and began to bleed air out from the gas phase above the reaction liquid phase. The air introduction rate was controlled so that the air exit rate was 8.47 cubic feet per minute. The aeration was continued for 4 hours, at which point the exit gas analyzed 11.3 percent oxygen. The reaction was then stopped and cooled. After water washed to remove the base, 2,6-di-tert-butyl-p-benzoquinone was recovered in 46.6 percent yield by distillation.

In the above example other alkali metal hydroxides can be used in place of the potassium hydroxide such as sodium hydroxide, cesium hydroxide, lithium hydroxide, and the like. Likewise, other 2,4,6-tri-tert-alkylphenols or mixtures containing these can be used, such as 2,4-di-tert-butyl-4-tert-amyl-phenol, 2,4-di-tert-butyl-4-(1,1-dimethyl-n-butyl)phenol, 2,4,6-tri-tert-octylphenol, 2,4,6-tri-tert-dodecylphenol, and the like.

EXAMPLE 2

Use of Potassium Hydroxide Catalyst Promoted With Water

In a pressure reaction vessel as used in example 1 was placed 375 parts of toluene and 376 parts of distillation bottoms obtained after removing mono- and di-tert-butylphenols from a reaction mixture resulting from the isobutylation of phenol employing the process described in U.S. Pat. 2,831,898. The bottoms contained 86 percent 2,4,6-tri-tert-butylphenol. Following this, 28 parts of flaked potassium hydroxide and 10 parts of water were added. The vessel was sealed and, while stirring, heated to 120° C. Air was then passed into the reaction vessel beneath the liquid layer until the pressure reached 325 p.s.i.g. At this point, the pressure relief valve opened and vented spent air from the vapor phase at a rate sufficient to maintain the pressure at 325 p.s.i.g. Air was continuously introduced beneath the liquid phase at a rate such that spent air vented at a rate of 10 cubic feet per minute. After 5 hours 15 minutes oxygen content in the vent air reached 13.8 percent and the reaction was stopped. The mixture was cooled and discharged and then washed with water to remove catalyst. Toluene was distilled from the product up to a liquid temperature of 110° C. at 20 mm. Hg. Distillation was then continued at 20 mm. Hg. up to a liquid temperature of 190° C., resulting in a distillate consisting predominantly of 2,6-di-tert-butyl-p-benzoquinone which was obtained in 57.7 percent yield.

As in the previous example, other alkali metal hydroxides can be substituted for the potassium hydroxide. Likewise, any of the previously listed 2,4,6-tri-tert-alkylphenols can be employed in the above example.

EXAMPLE 3

Use of Potassium Hydroxide Catalyst Promoted With Water and Cuprous Chloride

In the pressure reaction vessel of example 1 was placed 375 parts of the distillation bottoms described in the previous example. Then, 28 parts of potassium hydroxide, 10 parts of water and 10 parts of cuprous chloride were added. The vessel was sealed and, while stirring, heated to 120° C. Air was passed into the vessel until the pressure reached 325 p.s.i.g., and then the oxidation conducted as in the previous examples until the effluent air contained 14.3 percent oxygen. This required 4 hours 55 minutes. The reaction mixture was cooled, washed with water and 2,4-di-tert-bytyl-p-benzoquinone recovered as in the previous example, resulting in a yield of 58.3 percent.

Other copper salts can also be used in the above example such as cupric chloride, cuprous bromide, cupric bromide, cuprous iodide, cupric iodide, and the like. Likewise, cuprous or cupric oxide can be used in place of the copper halide.

As stated earlier, the benzoquinones produced by the present process can be readily reduced to the corresponding hydroquinones which are useful as antioxidants and as intermediates for the preparation of other antioxidant materials. The benzoquinones can be reduced by catalytic or chemical methods. For example, they can be catalytically hydrogenated by simply dissolving them in an inert solvent such as isopropanol or toluene and placing them in a hydrogenation vessel containing about one percent of their weight of a hydrogenation catalyst, such as Raney nickel, palladium on charcoal, copper chromite, and the like. Chemical reduction can be carried out by using such standard methods as zinc plus hydrochloric acid. In this method the benzoquinone is dissolved in an inert solvent such as isopropanol and then a stoichiometric excess of zinc is added. Then concentrated hydrochloric acid is passed into the mixture, reducing the benzoquinone to hydroquinone.

I claim:

1. A process for preparing a 2,6-di-tert-alkyl-p-benzoquinone, said process comprising contacting a 2,4,6-tri-tert-alkylphenol wherein said tert-alkyl groups contain from four to about 12 carbon atoms with an oxygen-containing gas in the presence of a catalytic amount of an alkali metal hydroxide at a temperature from about 50°–200° C.

2. The process of claim 1 wherein said alkali metal hydroxide is potassium hydroxide.

3. The process of claim 1 wherein there is copresent a promoter amount from about 1–50 parts/1,000 parts of 2,4,6-tri-tert-alkylphenol of water.

4. The process of claim 3 wherein there is copresent a promoter amount from about 0.25–5 parts/1,000 parts of 2,4,6-tri-tert-alkylphenol of a copper halide.

5. The process of claim 4 wherein said alkali metal hydroxide is potassium hydroxide.

6. The process of claim 5 wherein said copper halide is cuprous chloride.

7. The process of claim 6 wherein said phenol is 2,4,6-tri-tert-butylphenol.

* * * * *